United States Patent
Nagayama et al.

(10) Patent No.: US 11,263,266 B2
(45) Date of Patent: Mar. 1, 2022

(54) TRAFFIC ANOMALY SENSING DEVICE, TRAFFIC ANOMALY SENSING METHOD, AND TRAFFIC ANOMALY SENSING PROGRAM

(71) Applicant: NIPPON TELEGRAPH AND TELEPHONE CORPORATION, Tokyo (JP)

(72) Inventors: Hiroki Nagayama, Musashino (JP); Bo Hu, Musashino (JP); Kazunori Kamiya, Musashino (JP); Masaki Tanikawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 72 days.

(21) Appl. No.: 16/965,655

(22) PCT Filed: Feb. 27, 2019

(86) PCT No.: PCT/JP2019/007705
§ 371 (c)(1),
(2) Date: Jul. 29, 2020

(87) PCT Pub. No.: WO2019/168072
PCT Pub. Date: Sep. 6, 2019

(65) Prior Publication Data
US 2021/0042359 A1 Feb. 11, 2021

(30) Foreign Application Priority Data
Feb. 27, 2018 (JP) .............................. JP2018-033136

(51) Int. Cl.
*G06F 16/901* (2019.01)
*G06K 9/62* (2022.01)
*H04L 29/06* (2006.01)

(52) U.S. Cl.
CPC ....... *G06F 16/9024* (2019.01); *G06K 9/6215* (2013.01); *G06K 9/6232* (2013.01);
(Continued)

(58) Field of Classification Search
CPC .............. G06F 16/9024; G06K 9/6215; G06K 9/6232; G06K 9/6256; G06K 9/6276; H04L 63/1425; H04L 12/28
See application file for complete search history.

(56) References Cited

U.S. PATENT DOCUMENTS

| 10,887,337 B1* | 1/2021 | Kim | ........................ H04L 67/08 |
| 2017/0063905 A1* | 3/2017 | Muddu | ................... H04L 41/22 |
| 2021/0021616 A1* | 1/2021 | Shabtai | ................... H04L 41/14 |

OTHER PUBLICATIONS

David Whyte et al.—"ARP-based Detection of Scanning Worms Within an Enterprise Network", Proc of annual computer security applications conference( ACSAC 2005), Dec. 2005, 15 pp.
(Continued)

*Primary Examiner* — Michael Won
(74) *Attorney, Agent, or Firm* — Xsensus LLP (57) ABSTRACT

A traffic anomaly sensing system 10 includes a preprocessing unit 11, a local graph feature generation unit 12, a global graph feature generation unit 13, a learning unit 14, and an anomaly determination unit 15. The preprocessing unit 11 generates a communication history graph from traffic data. The local graph feature generation unit 12 generates, from the communication history graph, a local graph feature about a certain vertex. The global graph feature generation unit 13 generates, from the communication history graph, a global graph feature about a vertex. The learning unit 14 generates a feature vector by combining the generated local graph feature and the generated global graph feature and generates a learned model for each host identifier. The anomaly determination unit 15 determines whether the traf- (Continued)

fic data is anomalous or not by inputting the graph feature to the generated learned model.

6 Claims, 6 Drawing Sheets

(52) U.S. Cl.
CPC ......... *G06K 9/6256* (2013.01); *G06K 9/6276* (2013.01); *H04L 63/1425* (2013.01)

(56) References Cited

OTHER PUBLICATIONS

Yasser Yasami et al.—"A novel unsupervised classification approach for network anomaly detection by k-Means clustering and ID3 decision tree learning methods", The Journal of Supercomputing, Oct. 9, 2009, vol. 53, No. 1, 2010, pp. 231-245.

* cited by examiner

| Category | feature | detail | Direction | Feature # |
|---|---|---|---|---|
| Local graph feature | Degree | - | In/out/both | 1*3 = 3 |
| | In neighbor degree | min,max,maen,std | In/out/both | 4*3 = 12 |
| | Out neighbor degree | min,max,maen,std | In/out/both | 4*3 = 12 |
| | Clustering coefficient | - | - | 1*1 = 1 |
| | Square clustering coefficient | - | - | 1*1 = 1 |
| | Triangles | - | - | 1*1 = 1 |
| Global graph feature | Betweeness | - | - | 1*1 = 1 |
| | closeness | - | - | 1*1 = 1 |
| | Number of clique | - | - | 1*1 = 1 |
| | Katz | - | - | 1*1 = 1 |
| | Pagerank | - | - | 1*1 = 1 |
| | Hub(HIT algorithm) | - | - | 1*1 = 1 |
| | Authority(HIT algorithm) | - | - | 1*1 = 1 |
| | Subgraph | - | - | 1*1 = 1 |

TRAFFIC ANOMALY SENSING DEVICE, TRAFFIC ANOMALY SENSING METHOD, AND TRAFFIC ANOMALY SENSING PROGRAM

CROSS-REFERENCE TO RELATED APPLICATIONS

The present application is based on PCT filing PCT/JP2019/007705, filed Feb. 27, 2019, which claims priority to JP 2018-033136, filed Feb. 27, 2018, the entire contents of each are incorporated herein by reference.

TECHNICAL FIELD

The present invention relates to a traffic anomaly sensing system, a traffic anomaly sensing method, and a traffic anomaly sensing program.

BACKGROUND ART

With the recent spread of the Internet, the technology of sensing anomalies in the network traffic is becoming increasingly important. Conventional techniques for sensing anomalies using the network traffic include sensing anomalies by statistic or machine learning using features of a mechanical access pattern such as access to an unused IP address or sequential IP or an increase in the number of communications or communication destination IPs per unit of time, or the like.

For example, NPL 1 discloses a technology for sensing anomalies in the network traffic by sensing outliers in statistics using features of access to the unused IP address or a communication frequency for each terminal. In addition, NPL 2 discloses a technology of sensing anomalies in the network traffic by algorithms of K-means and Id3 Decision tree using features of access to the unused IP address, access to sequential IP address, or communication frequency.

CITATION LIST

Non Patent Literature

[NPL 1] D. Whyte, et al., "ARP-based Detection of Scanning Worms Within an Enterprise Network", Proc of annual computer security applications conference (ACSAC 2005), Tucson, Ariz., 59 December 2005

[NPL 2] Y. Yasami, et al., "A novel unsupervised classification approach for network anomaly detection by k-Means clustering and ID3 decision tree learning methods", The Journal of Supercomputing, Volume 53, Issue 1, July 2010, pages 231-245

SUMMARY OF THE INVENTION

Technical Problem

Unfortunately, the above conventional technologies have the following problems. For example, the attacking server may perform attacks such as scan and exploit of a very small amount and at a low rate to avoid the anomaly sensing. In this case, the possibility will increase that the anomaly sensing is avoided, when using features of a change in the communication volume such as an increase in the number of communications or communication destination IPs per unit of time. In addition, even when using the feature of the sequential access, anomalies may not be observed for attacks of a small amount and at a low rate because it is assumed that a plurality of attacks occur in a unit of sensing time. In addition, in this case, the possibility will also increase that access to the unused IP address is avoided. In addition, when using the feature of the unused IP access, there is a drawback that the anomaly sensing rate largely depends on the IP utilization rate in the address space.

The disclosed technology was accomplished in light of the above problems and a purpose thereof is to provide a traffic anomaly sensing system, a traffic anomaly sensing method, and a traffic anomaly sensing program that may sense anomalies even for attacks of small amount and at a low rate.

Means for Solving the Problem

To solve the above problem and achieve the purpose, this application discloses a traffic anomaly sensing system including: a graph generation unit for extracting from traffic data a communication history including a set of a communication-source host identifier and a communication-destination host identifier and generating a communication history graph that includes the host identifiers as vertices and communication between the host identifiers as an edge; a local feature generation unit for generating, from the generated communication history graph, a local graph feature about a certain vertex, the local graph feature being calculated in consideration of a graph structure including the vertex and a primary neighbor vertex or a secondary neighbor vertex thereof; a global feature generation unit for generating, from the generated communication history graph, a global graph feature about the vertex, the global graph feature being calculated in consideration of a structure of an entire graph; a learning unit for generating a feature vector for each host identifier by combining the generated local graph feature and the generated global graph feature and generating a learned model for each host identifier using the feature vector; and a determination unit for determining whether the traffic data is anomalous or not by inputting to the generated learned model, as a feature vector, a graph feature subjected to anomaly determination.

In addition, this application discloses a traffic anomaly sensing method including, in one aspect: a graph generation step of, by a traffic anomaly sensing system, extracting from traffic data a communication history including a set of a communication-source host identifier and a communication-destination host identifier and generating a communication history graph that includes the host identifiers as vertices and communication between the host identifiers as an edge; a local feature generation step of, by a traffic anomaly sensing system, generating, from the generated communication history graph, a local graph feature about a certain vertex, the local graph feature being calculated in consideration of a graph structure including the vertex and a primary neighbor vertex or a secondary neighbor vertex thereof; a global feature generation step of, by a traffic anomaly sensing system, generating, from the generated communication history graph, a global graph feature about the vertex, the global graph feature being calculated in consideration of a structure of an entire graph; a learning step of, by a traffic anomaly sensing system, generating a feature vector for each host identifier by combining the generated local graph feature and the generated global graph feature and generating a learned model for each host identifier using the feature vector; and a determination step of, by a traffic anomaly sensing system, determining whether the traffic data is anomalous or not by inputting to the generated learned model, as a feature vector, a graph feature subjected to anomaly determination.

Further, this application discloses a traffic anomaly sensing program for, in one aspect, causing a computer to perform: a graph generation step of extracting from traffic data a communication history including a set of a communication-source host identifier and a communication-destination host identifier and generating a communication history graph that includes the host identifiers as vertices and communication between the host identifiers as an edge; a local feature generation step of generating, from the generated communication history graph, a local graph feature about a certain vertex, the local graph feature being calculated in consideration of a graph structure including the vertex and a primary neighbor vertex or a secondary neighbor vertex thereof; a global feature generation step of generating, from the generated communication history graph, a global graph feature about the vertex, the global graph feature being calculated in consideration of a structure of an entire graph; a learning step of generating a feature vector for each host identifier by combining the generated local graph feature and the generated global graph feature and generating a learned model for each host identifier using the feature vector; and a determination step of determining whether the traffic data is anomalous or not by inputting to the generated learned model, as a feature vector, a graph feature subjected to anomaly determination.

Effects of the Invention

A traffic anomaly sensing system, a traffic anomaly sensing method, and a traffic anomaly sensing program disclosed in this application may provide an effect of being able to sense anomalies even for attacks of small amount and at a low rate.

DESCRIPTION OF EMBODIMENT

Embodiments of a traffic anomaly sensing system, a traffic anomaly sensing method, and a traffic anomaly sensing program disclosed in this application will be described in more detail with reference to the drawings. The embodiments below are not intended to limit the traffic anomaly sensing system, the traffic anomaly sensing method, and the traffic anomaly sensing program disclosed in this application.

Figure 1:
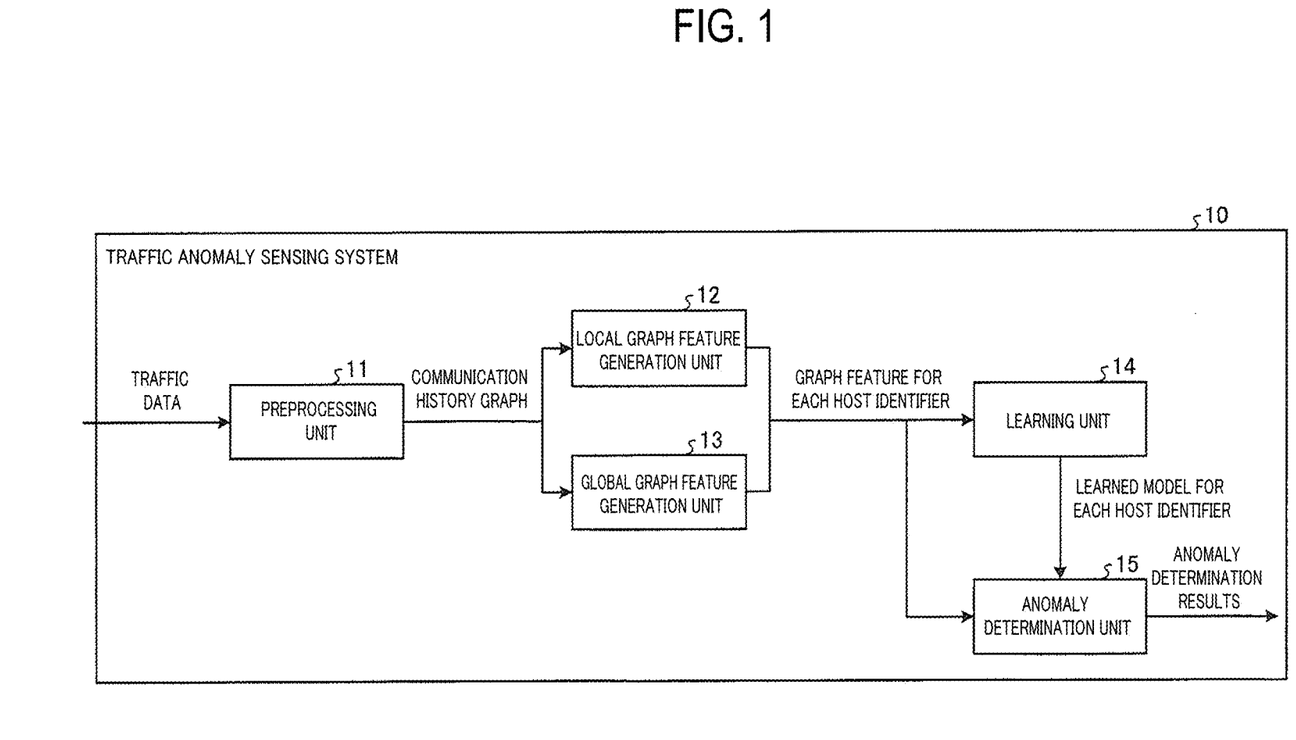
FIG. 1 shows a configuration of a traffic anomaly sensing system according to this embodiment.

A description is first given of a configuration of a traffic anomaly sensing system according to one embodiment disclosed in this application. FIG. 1 shows a configuration of a traffic anomaly sensing system 10 according to this embodiment. As shown in FIG. 1, the traffic anomaly sensing system 10 includes a preprocessing unit 11, a local graph feature generation unit 12, a global graph feature generation unit 13, a learning unit 14, and an anomaly determination unit 15. These components are connected so that unidirectional or bidirectional input and output of signal and data are possible.

The preprocessing unit 11 extracts, from traffic data, a communication history including a set of a communication-source host identifier and a communication-destination host identifier and generates a communication history graph that includes the host identifiers as vertices and communication between the host identifiers as an edge. The local graph feature generation unit 12 generates, from the generated communication history graph, a local graph feature about a certain vertex, the local graph feature being calculated in consideration of a graph structure including the vertex and a primary neighbor vertex or a secondary neighbor vertex thereof. The global graph feature generation unit 13 generates, from the generated communication history graph, a global graph feature about the vertex, the global graph feature being calculated in consideration of a structure of the entire graph. The learning unit 14 generates a feature vector for each host identifier by combining the generated local graph feature and the generated global graph feature and generates a learned model for each host identifier using the feature vector. The anomaly determination unit 15 determines whether the traffic data is anomalous or not by inputting to the generated learned model, as a feature vector, a graph feature subjected to the anomaly determination, the graph feature being generated from an unknown communication history in an anomaly sensing (test) period.

Figure 2:
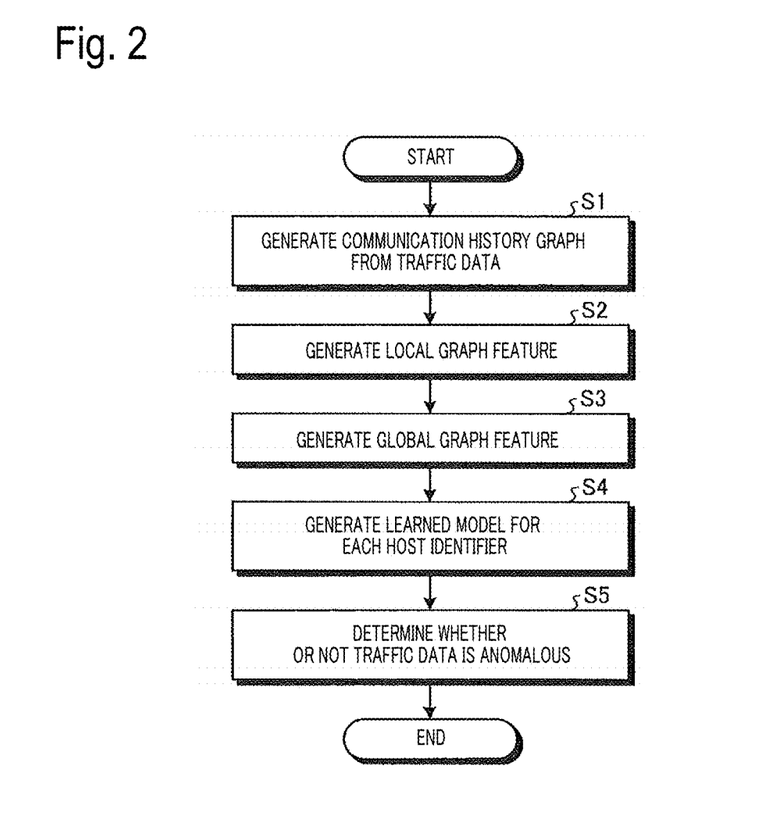
FIG. 2 is a flowchart for describing an operation of the traffic anomaly sensing system according to this embodiment.

A description is now given of an operation of the traffic anomaly sensing system 10 the according to one embodiment disclosed in this application. FIG. 2 is a flowchart for illustrating the operation of the traffic anomaly sensing system 10 according to this embodiment.

First at S1, the traffic anomaly sensing system 10 generates, by the preprocessing unit 11, a communication history graph from the traffic data. Next at S2, the traffic anomaly sensing system 10 generates, by the local graph feature generation unit 12, a local graph feature about a certain vertex from the communication history graph. At S3, the traffic anomaly sensing system 10 generates, by the global graph feature generation unit 13, a global graph feature about the vertex from the communication history graph. At S4, the traffic anomaly sensing system 10 generates, by the learning unit 14, a feature vector by combining the generated local graph feature and the generated global graph feature and generates a learned model for each host identifier. At S5, the traffic anomaly sensing system 10 determines and outputs, by the anomaly determination unit 15, whether traffic data is anomalous or not by inputting the graph feature to the generated learned model.

Figure 3:
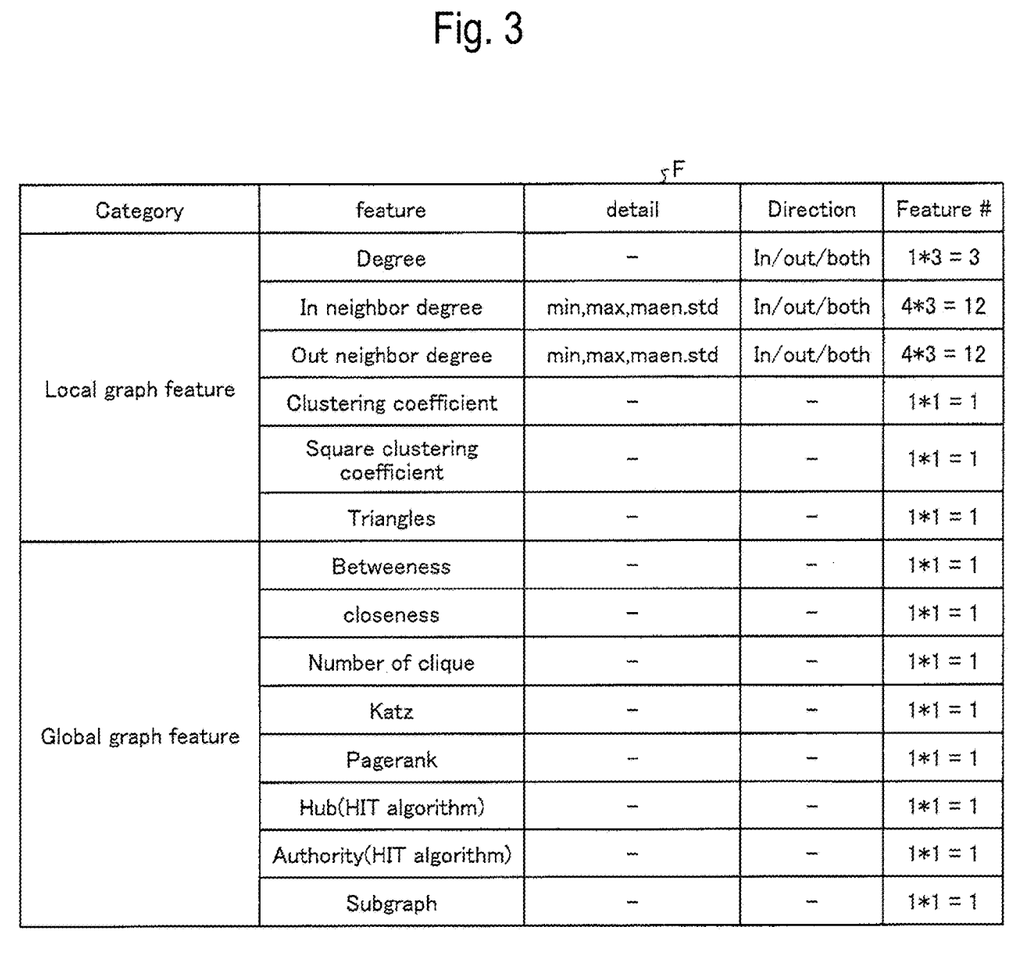
FIG. 3 shows an example of local and global graph features calculated in this embodiment.

Next, with reference to FIG. 3 to FIG. 5, the above operation flow will be described more specifically for a learning period and an anomaly sensing period.

The following conditions are assumed in the discussion below. First, with regards to the attacks, an infected terminal exists in a local area network (LAN), and a malicious program in the infected terminal generates communication to extend intrusion. To discover a vulnerable terminal, the malicious program randomly port scans the internet protocol (IP) of a subnet to which the infected terminal belongs. The port scan by the malicious program is a slow scan at a low rate of five minutes or more interval. Next, with regards to the LAN environment, a subnet with a general size of /24 is assumed. In addition, in the learning period, attacks such as port scan do not occur in the LAN.

(Operation Flow in Learning Period)

In the learning period (for example, four weeks), the traffic anomaly sensing system 10 collects an address resolution protocol (ARP) request from any port of any network equipment in the subnet, and then extracts, from each ARP request, a communication history including a set of an Src IP address and a Dst IP address. Here, the Dst IP address refers to an IP address subjected to the MAC address resolution.

Next, the traffic anomaly sensing system 10 divides the extracted communication history into five minutes, and generates, for each divided communication history, a communication history graph representing the communication history between the terminals in the subnet, and uses it as a communication history graph under normal conditions.

Next, the traffic anomaly sensing system 10 copies each generated communication history graph, and mixes communication that simulates a scan (the communication corresponds to an edge in the communication graph) in each copied communication history graph, and uses it as the communication history graph under anomalous conditions.

Next, the traffic anomaly sensing system 10 calculates, from the generated communication history graphs under normal and anomalous conditions, the local and global graph features about each vertex in the graph, and uses them as the graph features under normal and anomalous conditions.

Then, the traffic anomaly sensing system 10 inputs the graph features under normal and anomalous conditions to gradient boosting decision tree (GBDT), which is a decision tree based learning model, and generates, for each vertex, a learned model for classifying normality or anomaly of the communication connection relationship.

(Operation Flow in Anomaly Sensing Period)

First, the traffic anomaly sensing system 10 receives the collected communication history in real time, divides the communication history in five minutes to generate a communication history graph, and calculates, from the generated communication history graph, local and global graph features for each vertex in the graph. FIG. 3 shows an example of the calculated local and global graph features F. FIG. 3 shows an example where it is calculated that the local graph feature has a value of 3, the feature about an out-neighbor vertex has a value of 12, and the feature about an in-neighbor vertex has a value of 12.

Next, the traffic anomaly sensing system 10 inputs the calculated graph features to the learned model, determines whether the graph feature of each vertex is normal or anomalous, and thus determines and outputs whether the communication of a terminal corresponding to each vertex is normal or not.

Figure 4:
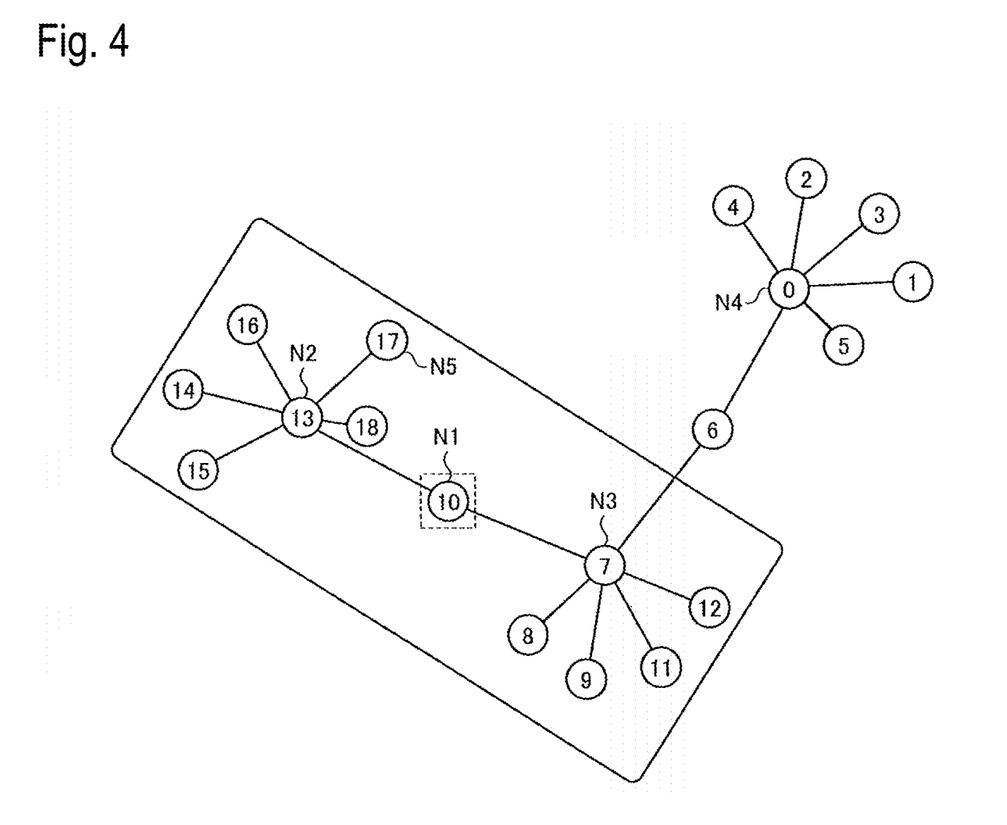
FIG. 4 illustrates the reason the local feature is used in connection with the global feature in this embodiment.

FIG. 4 illustrates the reason the local feature is used in connection with the global feature in this embodiment. As shown in FIG. 4, if neighbor degree centrality is used as an example of the local feature and when, for example, attention is paid to no. 10 corresponding to the vertex N1 surrounded by a broken line, a feature near the vertex no. 10 may be observed that the vertex no. 10 is only connected to the vertices N2 and N3 (for example, no. 13 and 7) with large degree centrality. Therefore, if, in the anomaly sensing period, the vertex no. 10 is connected to the vertex N4 (for example, no. 0) with small degree centrality, it may be determined that anomaly occurs. In this way, although the detailed feature near a specific vertex may not be understood only from the global feature, the traffic anomaly sensing system 10 may determine the presence or absence of the anomaly also in consideration of the detailed feature near the specific vertex by using the local feature as well.

Figure 5:
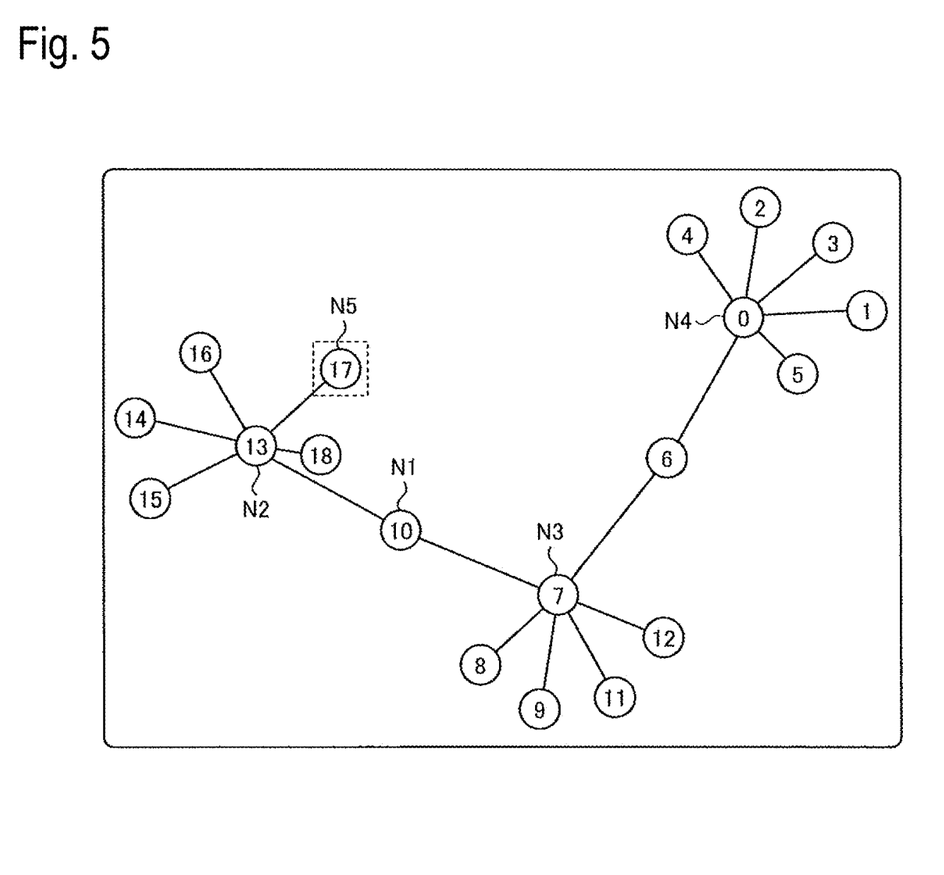
FIG. 5 illustrates the reason the global feature is used in connection with the local feature in this embodiment.

FIG. 5 illustrates the reason the global feature is used in connection with the local feature in this embodiment. As shown in FIG. 5, if closeness centrality is used as an example of the global feature and when, for example, attention is paid to no. 17 corresponding to the vertex N5 surrounded by a broken line, a feature near the vertex no. 17 may be observed that the vertex no. 17 is connected to the end in the entire communication history graph. Therefore, if, in the anomaly sensing period, the vertex N5 is connected to vertices such as the vertices N4 and N3 (for example, no. 0 and 7), the distance decreases rapidly between the vertex N5 and each vertex in the graph, and thus it may be determined that anomaly occurs. In this way, although the connection positional relationship of a specific vertex in the entire graph may not be understood only from the local feature, the traffic anomaly sensing system 10 may determine the presence or absence of the anomaly also in consideration of the connection positional relationship of the specific vertex in the entire graph by using the global feature as well.

As described above, in the learning period, the traffic anomaly sensing system 10 acquires the network traffic data and generates a communication history graph representing the communication history between the terminals per unit of time. Next, for each communication history graph, the traffic anomaly sensing system 10 calculates the local and global features for each node (vertex), and generates the learning model for each node by learning both category features. Here, the local feature is, for a certain node v, a feature calculated in consideration of a partial structure in the graph, such as a primary neighbor node or a secondary neighbor node of the v. The local feature includes a feature of the degree centrality. In contrast, the global feature is, for a certain node v, a feature calculated in consideration of the entire graph structure. The global feature includes a feature of betweenness centrality and a feature of the closeness centrality.

Then, in the anomaly sensing period, as in the learning period, the traffic anomaly sensing system 10 calculates the graph feature for each node per unit of time, and inputs them successively to the learned model, thus determining whether the network traffic data is normal or anomalous.

In other words, the traffic anomaly sensing system 10 learns the connection relationship in the communication of each terminal, determines and outputs the presence or absence of the anomaly in the traffic data on the basis of the learning results, and thus may sense even attacks of small amount and at a low rate, which are difficult to sense in the conventional technologies.

In the traffic anomaly sensing system 10, the local graph feature generation unit 12 may calculate graph features about a certain vertex using a graph structure including the certain vertex and a primary neighbor vertex thereof, the graph features including degree centrality, out-degree centrality, in-degree centrality, a cluster coefficient, and a number of triangle graphs of the certain vertex, and may use at least one of the graph features as the local graph feature.

In addition, in the traffic anomaly sensing system 10, the local graph feature generation unit 12 may calculate graph features about a certain vertex using a graph structure including the certain vertex and a secondary neighbor vertex thereof, the graph features including degree centrality, out-degree centrality, and in-degree centrality about an out-neighbor vertex of the certain vertex, as well as degree centrality, out-degree centrality, and in-degree centrality about an in-neighbor vertex of the certain vertex, as well as square clustering coefficient of the certain vertex, and may use at least one of the graph features as the local graph feature.

In addition, in the traffic anomaly sensing system 10, the global graph feature generation unit 13 may calculate graph features about a certain vertex using the structure of the entire graph, the graph features including betweenness centrality, closeness centrality, a number of cliques, Katz Centrality, a Pagerank score, a hub score calculated from a HITS algorithm, an authority score calculated from the HITS algorithm, and sub graph centrality of the vertex, and may use at least one of the graph features as the global graph feature.

(Traffic Anomaly Sensing Program)

Figure 6:
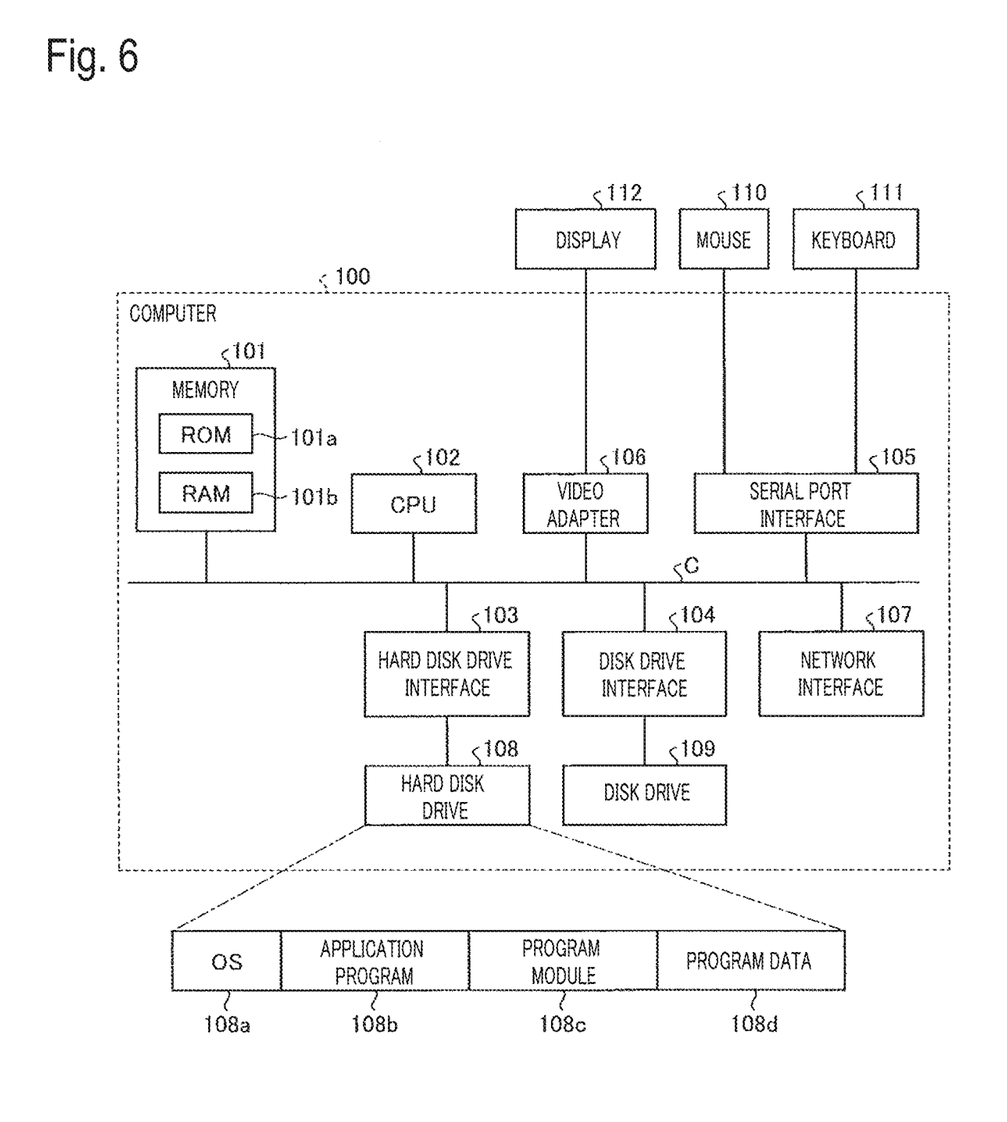
FIG. 6 illustrates a computer configured to specifically achieve information processing by the traffic anomaly sensing program according to this embodiment.

FIG. 6 illustrates a computer 100 configured to specifically achieve information processing by the traffic anomaly sensing program according to this embodiment. As shown in FIG. 6, the computer 100 includes, for example, a memory 101, a central processing unit (CPU) 102, a hard disk drive interface 103, a disk drive interface 104, a serial port interface 105, a video adapter 106, and a network interface 107, which are all connected via a bus C.

The memory 101 includes, as shown in FIG. 6, a read only memory (ROM) 101a and a random access memory (RAM) 101b. The ROM 101a stores, for example, a boot program such as a basic input output system (BIOS). The hard disk drive interface 103 is connected, as shown in FIG. 6, to a hard disk drive 108. The disk drive interface 104 is connected, as shown in FIG. 6, to a disk drive 109. For example, removable storage media such as a magnetic disk and an optical disk are inserted into the disk drive 109. The serial port interface 105 is connected, as shown in FIG. 6, to a mouse 110 and a keyboard 111, for example. The video adapter 106 is connected, as shown in FIG. 6, to a display 112, for example.

Here, as shown in FIG. 6, the hard disk drive 108 stores, for example, an operating system (OS) 108a, an application program 108b, a program module 108c, program data 108d, the traffic data, the communication history graph, the local graph feature, the global graph feature, and the learned model. In other words, the traffic anomaly sensing program according to the disclosed technology is stored in, for example, the hard disk drive 108 as the program module 108c describing instruction performed by the computer 100. Specifically, the program module 108c stored in the hard disk drive 108 describes various procedures for performing the same information processing as that by the preprocessing unit 11, the local graph feature generation unit 12, the global graph feature generation unit 13, the learning unit 14, and the anomaly determination unit 15, which are described in the above embodiments. In addition, data used in the information processing done by the traffic anomaly sensing program is stored, for example, in the hard disk drive 108 as the program data 108d. Then, the CPU 102 reads, as necessary, to the RAM 101b, the program module 108c and program data 108d stored in the hard disk drive 108, and performs the above various procedures.

Note that the program module 108c and program data 108d according to the traffic anomaly sensing program are not limited to being stored in the hard disk drive 108, and may be stored in a removable storage media and read out by the CPU 102 via the disk drive 109 or the like, for example. Alternatively, the program module 108c and the program data 108d according to the traffic anomaly sensing program may be stored in other computers connected via a network (such as a LAN or wide area network (WAN)) and read out by the CPU 102 via the network interface 107.

In addition, each element in the above described traffic anomaly sensing system 10 may not be necessarily configured as physically shown. In other words, specific aspects of the distribution and integration of each device are not limited to those as shown, and all or some of the devices may be configured by functionally or physically distributing or integrating them in any unit depending on various loads and utilization or the like. For example, the local graph feature generation unit 12 and global graph feature generation unit 13 or the learning unit 14 and anomaly determination unit 15 may be integrated into one element. Conversely, the learning unit 14 may be distributed into a unit for generating a feature vector and a unit for generating a learned model, for each host identifier. In addition, the hard disk drive 108 that stores the traffic data, the communication history graph, the local graph feature, the global graph feature, and the learned model may be connected as an external device of the traffic anomaly sensing system 10 via a network or cable.

REFERENCE SIGNS LIST

10 Traffic anomaly sensing system
11 Preprocessing unit
12 Local graph feature generation unit
13 Global graph feature generation unit
14 Learning unit
15 Anomaly determination unit
100 Computer
101 Memory
101a ROM
101b RAM
102 CPU
103 Hard disk drive interface
104 Disk drive interface
105 Serial port interface
106 Video adapter
107 Network interface
108 Hard disk drive
108a OS
108b Application program
108c Program module
108d Program data
109 Disk drive
110 Mouse
111 Keyboard
112 Display
F Graph feature
N1, N2, N3, N4, N5 Vertex

The invention claimed is:

1. A traffic anomaly sensing system comprising: a graph generation unit for extracting from traffic data a communication history including a set of a communication-source host identifier and a communication-destination host identifier and generating a communication history graph that includes the host identifiers as vertices and communication between the host identifiers as an edge; a local feature generation unit for generating, from the generated communication history graph, a local graph feature about a certain vertex, the local graph feature being calculated in consideration of a graph structure including the vertex and a primary neighbor vertex or a secondary neighbor vertex thereof; a global feature generation unit for generating, from the generated communication history graph, a global graph feature about the vertex, the global graph feature being calculated in consideration of a structure of an entire graph;

a learning unit for generating a feature vector for each host identifier by combining the generated local graph feature and the generated global graph feature and generating a learned model for each host identifier using the feature vector; and a determination unit for determining whether the traffic data is anomalous or not by inputting to the generated learned model, as a feature vector, a graph feature subjected to anomaly determination.

2. The traffic anomaly sensing system according to claim 1, wherein the local feature generation unit calculates graph features about a certain vertex using a graph structure including the certain vertex and a primary neighbor vertex thereof, the graph features including degree centrality, out-degree centrality, in-degree centrality, a cluster coefficient, and a number of triangle graphs of the certain vertex, and uses at least one of the graph features as the local graph feature.

3. The traffic anomaly sensing system according to claim 1, wherein the local feature generation unit calculates graph features about a certain vertex using a graph structure including the certain vertex and a secondary neighbor vertex thereof, the graph features including degree centrality, out-degree centrality, and in-degree centrality about an out-neighbor vertex of the certain vertex, as well as degree centrality, out-degree centrality, and in-degree centrality about an in-neighbor vertex of the certain vertex, as well as square clustering coefficient of the certain vertex, and uses at least one of the graph features as the local graph feature.

4. The traffic anomaly sensing system according to claim 1, wherein the global feature generation unit calculates graph features about a certain vertex using the structure of the entire graph, the graph features including betweenness centrality, closeness centrality, a number of cliques, Katz Centrality, a Pagerank score, a hub score calculated from a HITS algorithm, an authority score calculated from the HITS algorithm, and sub graph centrality of the vertex, and uses at least one of the graph features as the global graph feature.

5. A traffic anomaly sensing method comprising: a graph generation step of, by a traffic anomaly sensing system, extracting from traffic data a communication history including a set of a communication-source host identifier and a communication-destination host identifier and generating a communication history graph that includes the host identifiers as vertices and communication between the host identifiers as an edge; a local feature generation step of, by a traffic anomaly sensing system, generating, from the generated communication history graph, a local graph feature about a certain vertex, the local graph feature being calculated in consideration of a graph structure including the vertex and a primary neighbor vertex or a secondary neighbor vertex thereof; a global feature generation step of, by a traffic anomaly sensing system, generating, from the generated communication history graph, a global graph feature about the vertex, the global graph feature being calculated in consideration of a structure of an entire graph; a learning step of, by a traffic anomaly sensing system, generating a feature vector for each host identifier by combining the generated local graph feature and the generated global graph feature and generating a learned model for each host identifier using the feature vector; and a determination step of, by a traffic anomaly sensing system, determining whether the traffic data is anomalous or not by inputting to the generated learned model, as a feature vector, a graph feature subjected to anomaly determination.

6. A traffic anomaly sensing program for causing a computer to perform: a graph generation step of extracting from traffic data a communication history including a set of a communication-source host identifier and a communication-destination host identifier and generating a communication history graph that includes the host identifiers as vertices and communication between the host identifiers as an edge; a local feature generation step of generating, from the generated communication history graph, a local graph feature about a certain vertex, the local graph feature being calculated in consideration of a graph structure including the vertex and a primary neighbor vertex or a secondary neighbor vertex thereof; a global feature generation step of generating, from the generated communication history graph, a global graph feature about the vertex, the global graph feature being calculated in consideration of a structure of an entire graph; a learning step of generating a feature vector for each host identifier by combining the generated local graph feature and the generated global graph feature and generating a learned model for each host identifier using the feature vector; and a determination step of determining whether the traffic data is anomalous or not by inputting to the generated learned model, as a feature vector, a graph feature subjected to anomaly determination.

* * * * *